US012789127B2

(12) United States Patent
Epli et al.

(10) Patent No.: US 12,789,127 B2
(45) Date of Patent: Nov. 10, 2026

(54) FILTER ELEMENT AND FILTER SYSTEM

(71) Applicant: MANN+HUMMEL GmbH, Ludwigsburg (DE)

(72) Inventors: Sven Epli, Heilbronn (DE); Jochen Linhart, Schwaikheim (DE); Jens Weine, Gaildorf (DE); Florian Keller, Ludwigsburg (DE); Robert Kusebauch, Landau (DE); Markus Kirschner, Egglkofen (DE); Daiane Pereira De Oliveira, Sao Paulo (BR); Christiano Ferreira Miguel, Sao Paulo (BR); Alexandre Deminovch, Sao Paulo (BR); Rafael Hiroshi Hirai, Sao Paulo (BR)

(73) Assignee: MANN+HUMMEL GmbH, Ludwigsburg (DE)

( * ) Notice: Subject to any disclaimer, the term of this patent is extended or adjusted under 35 U.S.C. 154(b) by 455 days.

(21) Appl. No.: 18/477,956

(22) Filed: Sep. 29, 2023

(65) Prior Publication Data

US 2024/0109015 A1 Apr. 4, 2024

(30) Foreign Application Priority Data

Sep. 29, 2022 (EP) .................................... 22198744

(51) Int. Cl.
*B01D 46/24* (2006.01)
*B01D 46/00* (2022.01)

(52) U.S. Cl.
CPC ..... *B01D 46/2403* (2013.01); *B01D 46/0002* (2013.01); *B01D 46/2414* (2013.01); *B01D 2201/291* (2013.01); *B01D 2201/31* (2013.01)

(58) Field of Classification Search
CPC ............ B01D 46/2403; B01D 46/2414; B01D 46/0002; B01D 2201/291; B01D 2201/31;
(Continued)

(56) References Cited

U.S. PATENT DOCUMENTS 4,904,382 A * 2/1990 Thomsen ............. B01D 35/153 55/504
6,652,614 B2 * 11/2003 Gieseke ............. B01D 46/2414 55/482

(Continued)

FOREIGN PATENT DOCUMENTS

DE 102015004089 A1 * 12/2015 ........... B01D 46/009
EP 0860189 A1 * 8/1998 ............. B01D 27/08

OTHER PUBLICATIONS

Machine translation of Gohle (DE 10 2015 004 089 A1).*

(Continued)

*Primary Examiner* — Ekandra S. Miller-Cruz
*Assistant Examiner* — Mahmoud Motaz Abdel Latif

(57) ABSTRACT

A filter element, in particular an air filter element, has a filter media body surrounding a hollow interior and has a first end and an opposite second end. A first end cap is positioned on the first end of the filter media body, and a second end cap is positioned on the second end of the filter media body. The second end cap is a closed end cap. The second end cap has a plurality of spaced-apart inner adapter projections arranged thereon and projecting in direction of a central axis away from the first end cap. At least some of the inner adapter projections are positioned in a circular arrangement so as to surround a center of the second end cap. Such a filter element is arranged in a housing of a filter system provided with a receiver arrangement for the filter element.

14 Claims, 9 Drawing Sheets

(58) Field of Classification Search
CPC ........ B01D 2265/021; B01D 2265/026; B01D 35/30
See application file for complete search history.

(56) References Cited

U.S. PATENT DOCUMENTS

| | | | | |
|---|---|---|---|---|
| 11,517,842 | B2 | 12/2022 | Baseotto et al. | |
| 2003/0182911 | A1 | 10/2003 | Schrage | |
| 2009/0049814 | A1 | 2/2009 | Baseotto et al. | |
| 2009/0272085 | A1 * | 11/2009 | Gieseke | B01D 46/64 55/502 |
| 2013/0042588 | A1 * | 2/2013 | Baseotto | F02M 35/02416 55/502 |
| 2013/0086877 | A1 * | 4/2013 | Kori | B01D 46/2414 55/482 |
| 2013/0263744 | A1 | 10/2013 | Osendorf et al. | |
| 2014/0144111 | A1 | 5/2014 | Campbell et al. | |
| 2015/0101298 | A1 | 4/2015 | Osendorf et al. | |
| 2016/0131094 | A1 | 5/2016 | Pereira et al. | |
| 2017/0254301 | A1 | 9/2017 | Marcondes et al. | |
| 2019/0270045 | A1 | 9/2019 | Donauer et al. | |
| 2022/0249991 | A1 * | 8/2022 | Gannon | B01D 17/10 |
| 2023/0058723 | A1 | 2/2023 | Baseotto et al. | |

OTHER PUBLICATIONS

EPO Search Report in corresponding EPO Appln. No. 22198744.9, 2023-02023, Munich, Germany.
Office Action in corresponding EPO Appln. No. 22198744.9, Jul. 3, 2025, 4 pages, EPO Munich, Germany.

* cited by examiner

FILTER ELEMENT AND FILTER SYSTEM

BACKGROUND OF THE INVENTION

The invention relates to a filter element, in particular an air filter element, and a filter system.

EP 2 175 960 B1 discloses air cleaners. It particularly concerns air cleaners in which the main filter cartridge includes an open end with an internally directed radial seal thereat, and a closed end. One member of a projection/receiver arrangement is positioned on the first end cap. Another member is included in a housing for securely supporting the main filter cartridge. A projection/receiver arrangement including first and second members is provided. One member of the projection/receiver arrangement is positioned on the access cover. It comprises a serpentine ring member, and can either be a ring projection or a ring-shaped receiver groove. The member of the projection/receiver arrangement, which is positioned on the access cover, comprises a serpentine receiving groove. Another member of the projection/receiver arrangement is positioned on the outer end surface of the end cap. It is engageable with the access cover in a defined manner. The first and second members of the projection/receiver arrangement are engaged to provide cantilevered support of the air filter cartridge at the second end. The first and second members of the projection/receiver arrangement are also engaged in a non-rotatable manner.

SUMMARY OF THE INVENTION

It is an object of the invention to provide an improved filter element for a filter system which can be mounted in a housing easily and reproducibly.

Another object is to provide a filter system with such a filter element which can be mounted in the housing easily and reproducibly.

The object is achieved according to one aspect of the invention by a filter element, in particular an air filter element, comprising a filter media body surrounding a hollow interior and having a first end and an opposite second end, a first end cap positioned on the first end of the filter media body, the first end cap having a central air flow aperture therethrough, and a second end cap positioned on the second end of the filter media body, the second end cap being a closed end cap, wherein the second end cap comprises a plurality of spaced-apart inner adapter projections arranged thereon and projecting in direction of a central axis away from the first end cap, wherein at least some of the inner adapter projections are positioned in a circular manner surrounding a center of the second end cap.

The other object is achieved by a filter system comprising a housing, a fluid inlet formed in a first housing part, a fluid outlet formed in the first housing part, and the housing being closed by a second housing part. A serviceable filter element is provided, the filter element having a first end and a second end, the second end being provided with inner adapter projections. The filter element is operatively accommodated in the housing, wherein the inner adapter projections of the second end cap of the filter element project into a receiver arrangement on the second housing part in a manner providing support for the filter element at the second end.

The dependent claims, the description, and the drawings describe advantageous embodiments of the invention.

According to one aspect of the invention, a filter element, in particular an air filter element, is proposed, comprising a filter media body surrounding a hollow interior and having a first end and an opposite second end, a first end cap positioned on the first end of the filter media body, the first end cap having a central air flow aperture therethrough, and a second end cap positioned on the second end of the filter media body, the second end cap being a closed end cap. The second end cap comprises a plurality of spaced-apart inner adapter projections arranged thereon and projecting in direction of a central axis away from the first end cap, wherein at least some of the inner adapter projections are positioned in a circular manner surrounding a center of the second end cap.

A circumferential recessed contour as a receiver arrangement on the housing cover engages several positive contours as inner adapter projections from the filter element side, e.g. to realize an anti-rotation device or shoring protection. The bottom design with a rosette as the receiver arrangement may be necessary to assemble the filter element, most because of a blind assembly of the filter element in a truck vehicle.

Advantageously, the filter element with the inner adapter projections may easily be mounted to the housing because the inner adapter projections may engage in a groove of a receiver arrangement in the housing cover. By changing from a typical continuous protruding contour to a number of smaller contours as inner adapter projections, arranged on a circular path, additional volume may be free for accommodating dirt in the housing. Thus, the space between the protrusions on the filter element may serve as dirt storage. There is more empty volume available in the groove of the housing cover due to the multiple projections on the end cap of the filter element. In this way, additional dirt can be absorbed or displaced in the necessary space. A better conduction of dirt particles towards the dust cap on the housing cover may be achieved, as the discrete contour of the inner adapter projections improves permeability in this area.

A positive side effect is that the fit to the receiver arrangement as an interface of the housing cover is improved. The reason for this is the higher number of small contours, which can be engaged more flexibly in the receiver arrangement. A better adaptation of the filter contour to the housing cover may advantageously be achieved.

According to a preferred embodiment, the second end cap comprises a plurality of spaced-apart outer adapter projections arranged thereon and positioned adjacent to an outer perimeter of the second end cap, the outer adapter projections each projecting in direction of the central axis away from the first end cap. The function of the inner adapter projections can be further optimized with a second circular cluster of protrusions as outer adapter projections arranged on the second end cap of the filter element. These outer adapter projections may serve for further support of the second end cap when closing the housing, with the filter element mounted therein, by the housing cover.

It should be noted that in an alternative, converse embodiment the housing cover may be provided with spaced-apart outer projections for further support of the second end cap of the filter element.

The filter element with the inner adapter projections can be used in a more flexible manner. It may be mounted in a filter system with one circulating groove on the housing cover, or with several grooves on the cover side. Advantageously, there is more volume for dirt available, before assembly problems may occur.

The feature with the inner adapter projection relates to a receiver arrangement, e.g. a rosette design in the housing cover, to assemble the round filter element in the housing of an air intake filter system. The first end cap may be manufactured from polyurethane (PUR) and the second end cap may be manufactured from plastics, e.g. PA or PP, as a hard component.

The robust design provides a strong assembly of the filter element in the housing and guarantees the correct assembly position in the air intake system.

According to an advantageous embodiment of the filter element, at least some of the inner adapter projections may be configured as straight slabs having a longitudinal extension, wherein a projection line in the longitudinal extension to the outer perimeter intersects the outer perimeter. The straight slabs may be advantageous to be manufactured in the end cap and favorably engage in the receiver arrangement of the housing. Compared to a continuous contour, additional space for accommodation of dust is available and the amount of plastic material needed for forming the projections can be reduced.

According to an advantageous alternative embodiment of the filter element, at least some of the inner adapter projections may be configured as curved slabs, comprising at least one arcuate section and a straight section. The straight section has a longitudinal extension, wherein a projection line in the longitudinal extension to the outer perimeter intersects the outer perimeter. The curved slabs may be advantageous to engage in the rosette-like receiver arrangement of the housing.

Compared to a continuous contour, additional space for accommodation of dust is available and the amount of plastic material needed for forming the projections can be reduced.

According to an advantageous embodiment of the filter element, the at least one arcuate section may have a convexly curved side wall, when viewed from the outer perimeter. Thus, a favorable engagement with the receiver arrangement of the housing cover may be possible.

According to an advantageous embodiment of the filter element, the inner adapter projections may be hollow, comprising an open end in the axial direction away from the first end cap. In this way, the inner adapter projections may favorably be manufactured with standard injection molding.

According to an advantageous embodiment of the filter element, the inner adapter projections may be provided with a conical shape tapering radially inwardly in the axial direction away from the first end cap. In other words, the projections taper towards their counterpart on the housing cover. This may favorably facilitate mounting of the filter element in the housing cover because of ease of engagement of the inner adapter projections in the receiver arrangement.

According to an advantageous embodiment of the filter element, the inner adapter projections may be distributed equidistantly around the central axis. However, non-equidistant distribution is also possible. For example, the projections could be arranged only on half of a circle around the center of the end cap. Favorably, mounting of the filter element to the housing cover may be facilitated due to suitable arrangement of the inner adapter projections.

According to a special embodiment of the filter element, the inner adapter projections may be positioned at different radial distances from the center of the second end cap. This embodiment could be used in a housing with several receiver arrangements arranged at different radial distances from the center of the corresponding housing part. Favorably, mounting of the filter element to the housing cover may be facilitated due to a suitable arrangement of the inner adapter projections.

According to an advantageous embodiment of the filter element, an axial alignment ring may be positioned on the second end cap, wherein the alignment ring surrounds and is radially spaced apart from the inner adapter projections. The alignment ring may serve as an additional alignment feature for mounting the filter element to the housing.

According to an advantageous embodiment of the filter element, the alignment ring may be connected to the outer adapter projections by radial struts. Thus, the stiffness of the end cap may favorably be enhanced.

According to an advantageous embodiment of the filter element, a backside of the second end cap may be provided with a support structure, in particular a grid. Thus, the stiffness of the end cap may favorably be enhanced.

According to another aspect of the invention, a filter system is proposed, comprising a housing with a fluid inlet formed in a first housing part and a fluid outlet formed in the first housing part, the housing being closed by a second housing part. The filter system further comprises a serviceable filter element, the filter element having a first end and a second end, the second end being provided with inner adapter projections, the filter element being operatively accommodated in the housing, the inner adapter projections of the second end cap of the filter element projecting into a receiver arrangement on the second housing part in a manner providing support for the filter element at the second end.

A circumferential recessed contour as a receiver arrangement on the housing cover engages several positive contours as inner adapter projections from the filter element side, e.g. to realize an anti-rotation device or shoring protection. The bottom design with a rosette as the receiver arrangement may be necessary to assemble the filter element, mostly because of a blind assembly of the filter element in a truck vehicle.

Advantageously, the filter element with the inner adapter projections may easily be mounted to the housing because the inner adapter projections may engage in a groove of a receiver arrangement in the housing cover. By changing from a typical continuous protruding contour to a number of smaller contours as inner adapter projections, arranged on a circular path, additional volume may be free for accommodating dirt in the housing. Thus, the protrusions on the filter element may serve as dirt storage. There is more empty volume available in the groove of the housing cover due to the multiple projections on the end cap of the filter element. In this way, additional dirt can be absorbed or displaced in the necessary space. A better conduction of dirt towards the dust cap on the housing cover may be achieved, as the discrete contour of the inner adapter projections improves permeability in this area.

A positive side effect is that the fit to the receiver arrangement as an interface of the housing cover is improved. The reason for this is the higher number of small contours, which can be engaged more flexibly in the receiver arrangement. A better adaptation of the filter contour to the housing cover may advantageously be achieved.

The function of the inner adapter projections can be further optimized with a second circular cluster of protrusions as outer adapter projections on the second end cap of the filter element. The outer adapter projections can abut against an inner surface of the second housing part, especially the housing cover, and provide axial support.

The filter element with the inner adapter projections can be used more flexibly. It may be mounted in a filter system with one circulating groove on the housing cover, or with several grooves on the cover side. Advantageously, there is more volume for dirt available, before assembly problems may occur.

The feature with the inner adapter projections relates to a receiver arrangement, preferably a rosette design in the housing cover to assemble, the filter element in the housing of filter system of an air intake system.

The robust design provides a strong assembly of the filter element in the housing and guarantees the correct assembly position in the air intake system.

According to an advantageous embodiment of the filter system, the receiver arrangement on the second housing part may be defined as a serpentine receiving groove in an inner surface of the second housing part. Thus, the filter element with the inner adapter projections may favorably be mounted to the housing by engaging the discrete inner adapter projections in the receiving groove of the receiver arrangement of the housing.

According to an advantageous embodiment of the filter system, the serpentine receiving groove may be configured as a continuous groove. Thus, the filter element with the inner adapter projections may favorably be mounted to the housing by engaging the discrete inner adapter projections in the continuous receiving groove of the receiver arrangement of the housing.

According to an alternative embodiment, the receiving groove may be comprised of several spaced-apart sections. In a further alternative embodiment, the receiver arrangement can comprise several receiving pockets. Each pocket can receive one of the inner adapter projections. The shape of the pockets can correspond to the shape of the projections, e.g. rectangular projections may be formed on the end cap of the filter element and engage rectangular pockets in the second housing part of the filter housing.

Instead of one receiving groove, two or more receiving grooves could be arranged on the housing part. The end cap may then comprise several projection arrangements arranged at different radial distances to the center of the end cap.

The inner adapter projections may have different lengths in axial direction. The receiver arrangement may also have a corresponding axial abutment surface with different distances relative to a main plane of the opposing end cap of the filter element. In this way, the filter element can only be arranged in a defined position in the housing.

BRIEF DESCRIPTION OF THE DRAWINGS

The present invention, together with the above-mentioned and other objects and advantages, may best be understood from the following detailed description of the embodiments, but is not limited to the embodiments.

DESCRIPTION OF PREFERRED EMBODIMENTS

Figure 1:
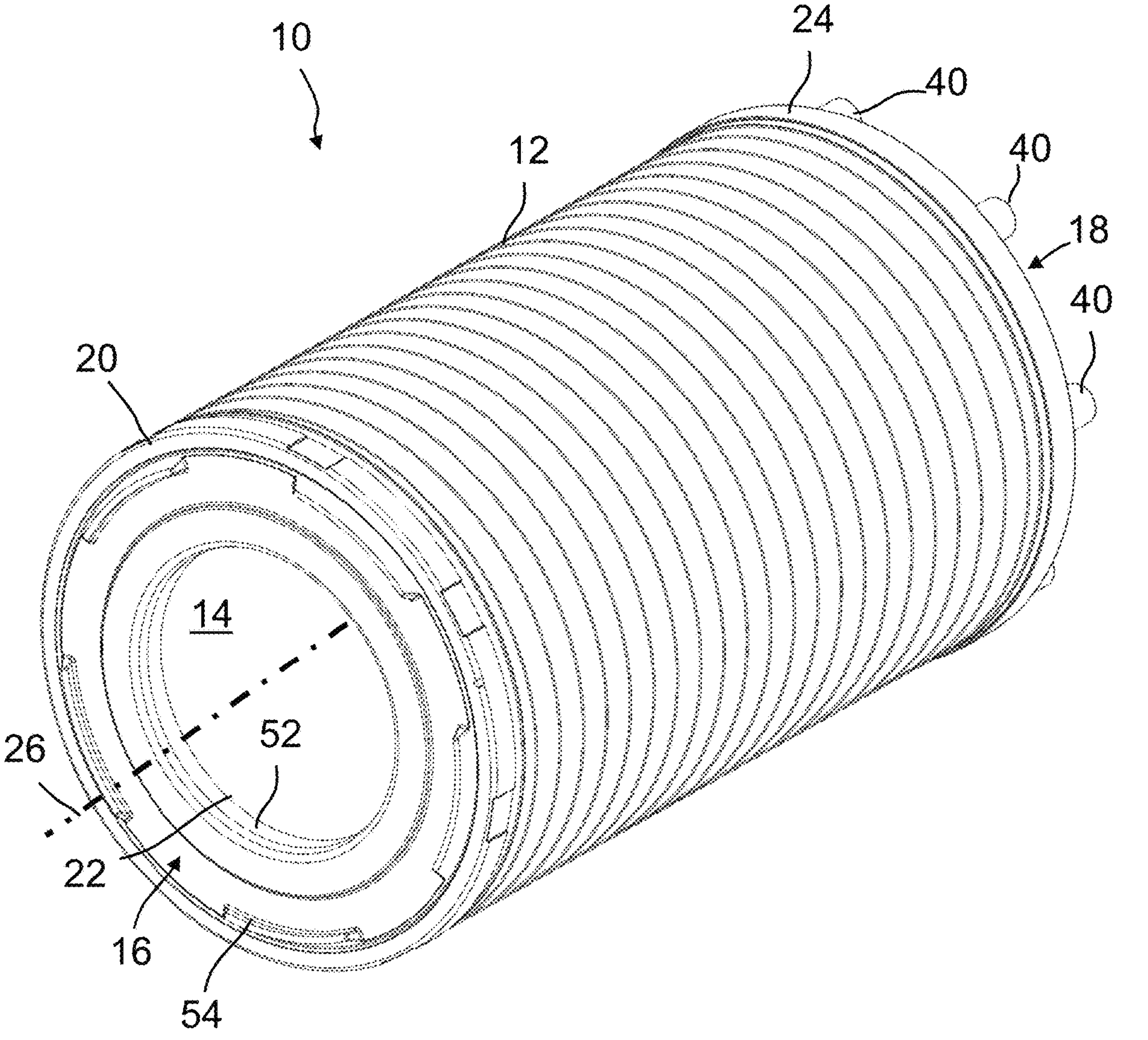
FIG. 1 shows in an isometric view a filter element according to an embodiment of the invention with a view on a first end cap.

In the drawings, like elements are referred to with same reference numerals. The drawings are merely schematic representations, not intended to portray specific parameters of the invention. Moreover, the drawings are intended to depict only typical embodiments of the invention and therefore should not be considered as limiting the scope of the invention.

Figure 2:
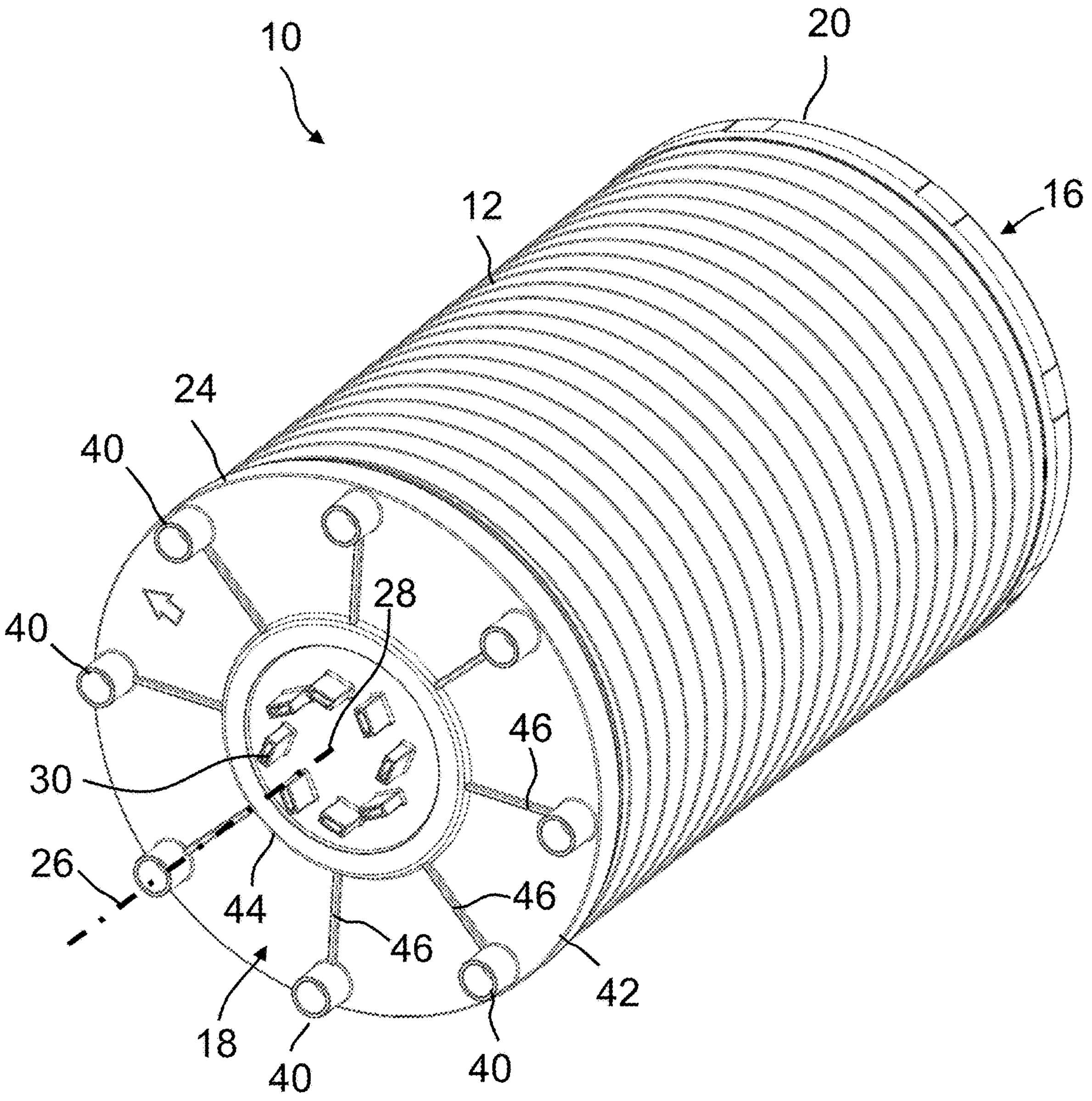
FIG. 2 shows in an isometric view the filter element according to FIG. 1 with a view on a second end cap.

FIG. 1 depicts in an isometric view a filter element 10 according to an embodiment of the invention with a view on a first end cap 20, whereas in FIG. 2 the filter element 10 is depicted with a view on a second end cap 24.

The filter element 10, in particular an air filter element, comprises a filter media body 12 surrounding a hollow interior 14 and having a first end 16 and an opposite second end 18. A first end cap 20 is positioned on the first end 16 of the filter media body 12. The first end cap 20 has a central air flow aperture 22 therethrough from the interior 14. The central air flow aperture 22 is configured with a radial housing seal 52 on an inner side for sealing a clean air side of the filter element 10 in the interior 14 from a raw air side when mounted in the housing.

The first end cap 20 further is configured with a number of support elements 54 surrounding a perimeter of the end cap 20 for fixing the filter element 10 when being mounted to a housing.

A second end cap 24 is positioned on the second end 18 of the filter media body 12, the second end cap 24 being a closed end cap. The second end cap 24 comprises a plurality of spaced-apart inner adapter projections 30 arranged thereon and projecting in direction of a central axis 26 away from the first end cap 20. At least some of the inner adapter projections 30 are positioned in a circular arrangement so as to surround a center 28 of the second end cap 24.

Furthermore, the second end cap 24 includes a plurality of spaced-apart outer adapter projections 40 arranged thereon and positioned adjacent to an outer perimeter 42 of the second end cap 24, the outer adapter projections 40 each projecting in direction of the central axis 26 away from the first end cap 20. These outer adapter projections 40 may serve for further support of the second end cap 24 when closing the housing 110, with the filter element 10 mounted therein, by the housing cover 114.

Figure 3:
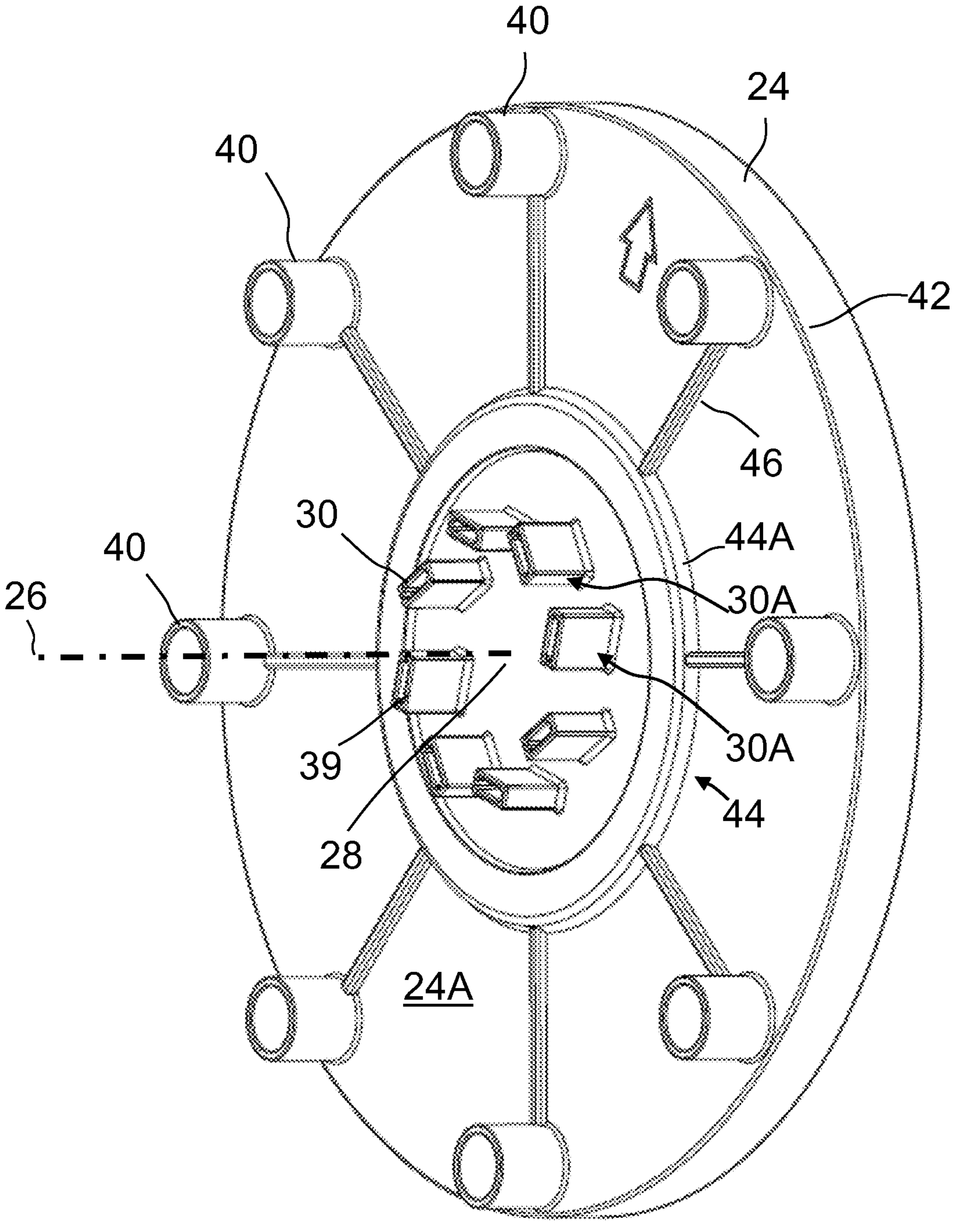
FIG. 3 shows in a detailed isometric view the second end cap of the filter element of FIG. 1.

FIG. 3 depicts the second end cap 24 of the filter element 10 in a detailed isometric view.

The inner adapter projections 30 are configured as straight slabs having a longitudinal extension, wherein a projection line in the longitudinal extension to the outer perimeter 42 intersects the outer perimeter 42. As is shown in FIG. 3, the straight slabs 30 have straight axially extending outer surfaces 30A maintaining a constant cross section shape of the straight slabs 30 in the longitudinal extension. As is shown in FIGS. 2 and 3, the constant cross section shape of the straight slabs 30 in the longitudinal extension may be substantially rectangular. The straight slabs may be advantageous to be manufactured in the end cap 24 and favorably engage in the receiver arrangement 116 of the housing 110, as may be seen in FIGS. 8 and 9. Also additional space, compared to a continuous contour, for accommodation of dust is available.

The inner adapter projections 30 are hollow, comprising an open end 39 in the axial direction 26 away from the first end cap 20. In this way, the inner adapter projections 30 may favorably be manufactured with standard injection molding tools.

The inner adapter projections 30 in the embodiment shown in the Figures are distributed equidistantly and positioned on a same radial distance around the central axis 26. In alternative embodiments, inner adapter projections 30 may also be distributed non-equidistantly and/or non-symmetrically around the center 28. In the embodiment shown, the rectangular adapter projections 30 are all arranged at the same angle, i.e. the angle between the straight outer surface of the projection 30 and the diameter of the circle is the same for all the projections 30. Alternatively, at least one of the projections 30, especially half of them, could be arranged with another angle, especially oriented in the opposite direction.

An axial alignment ring 44 is positioned on an axial outer face 24A of the second end cap 24 and having a circumferential radially outer surface 44A extending axially outwardly from the axial outer face 24A. The plurality of spaced-apart inner adapter projections 30 are arranged in a radial interior of the axial alignment ring 44 and projecting axially outwardly from the axial outer end face 24A of the second end cap 24. The alignment ring surrounds and is radially spaced apart from the inner adapter projections 30. The alignment ring 44 is connected to the outer adapter projections 40 by radial struts 46. The alignment ring 44 may serve as an additional alignment feature for mounting the filter element 10 to the housing 110. The stiffness of the end cap 24 may favorably be enhanced by the radial struts 46.

Figure 4:
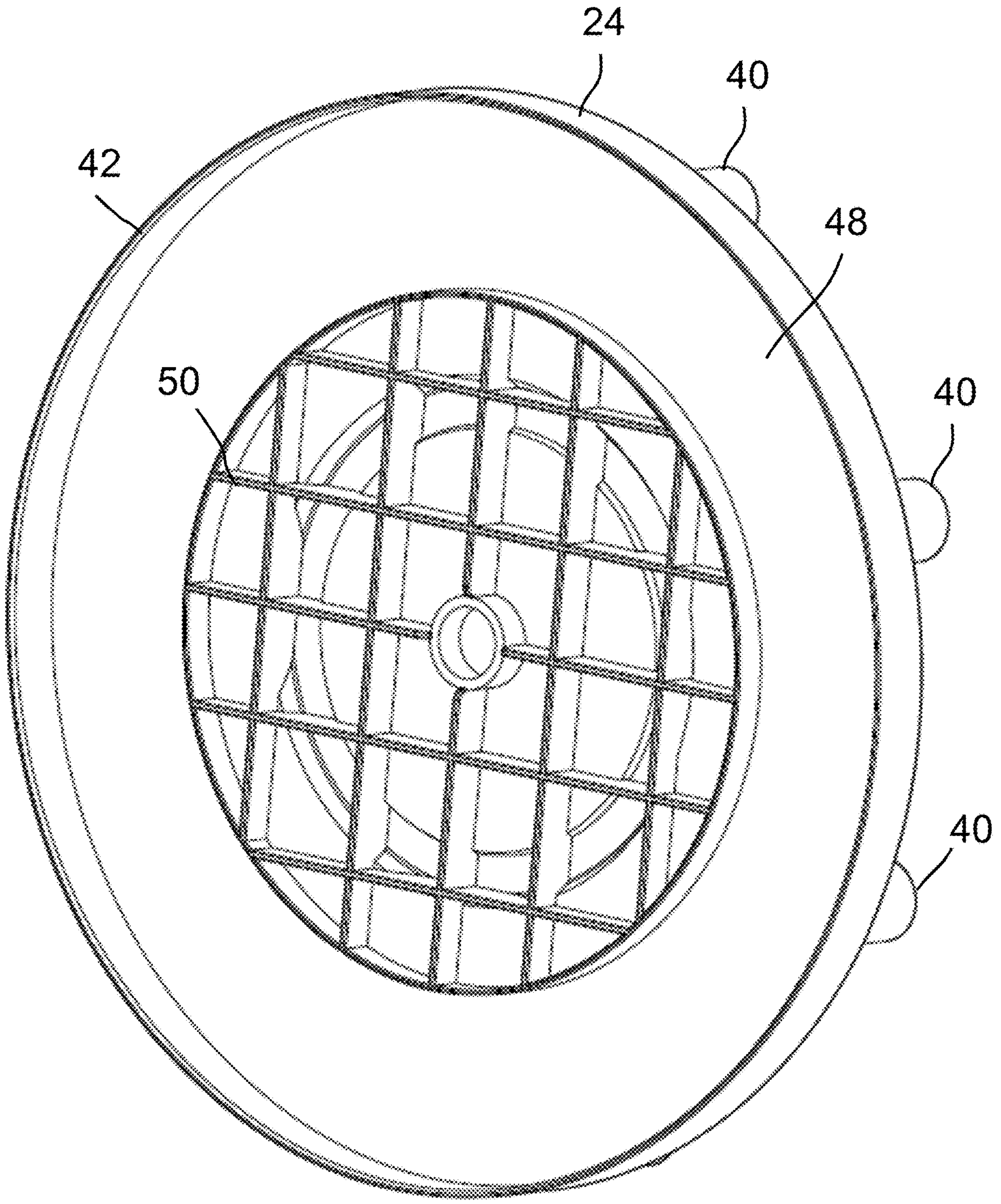
FIG. 4 shows in a detailed isometric view the second end cap of the filter element of FIG. 1 from a backside.

FIG. 4 depicts the second end cap 24 of the filter element 10 from a backside. The backside 48 of the second end cap 24 is provided with a support structure 50, formed as a grid. Thus the stiffness of the end cap 24 may favorably be enhanced.

Figure 5:
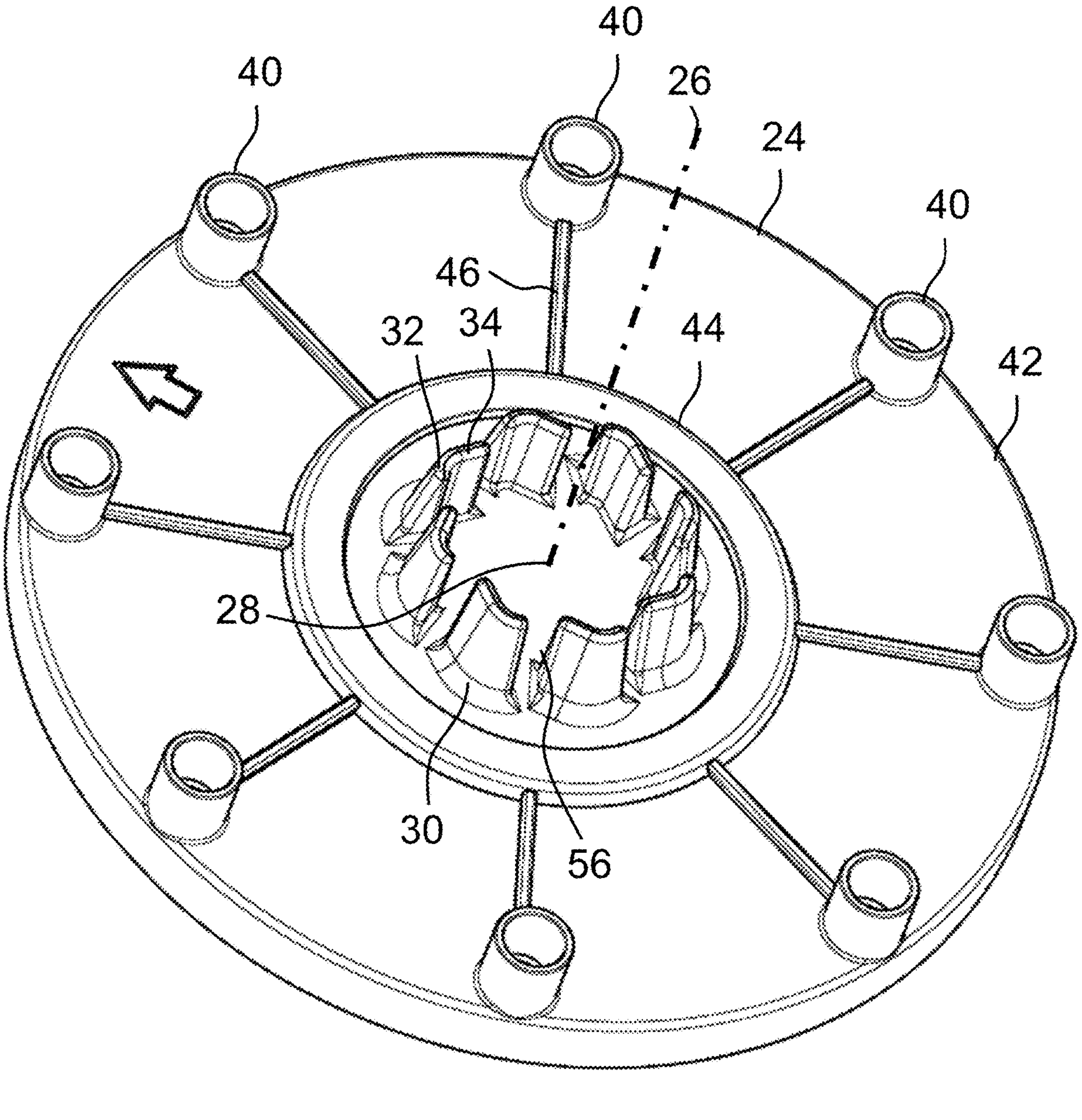
FIG. 5 shows in a detailed isometric view a second end cap of a filter element according to a further embodiment of the invention.
Figure 6:
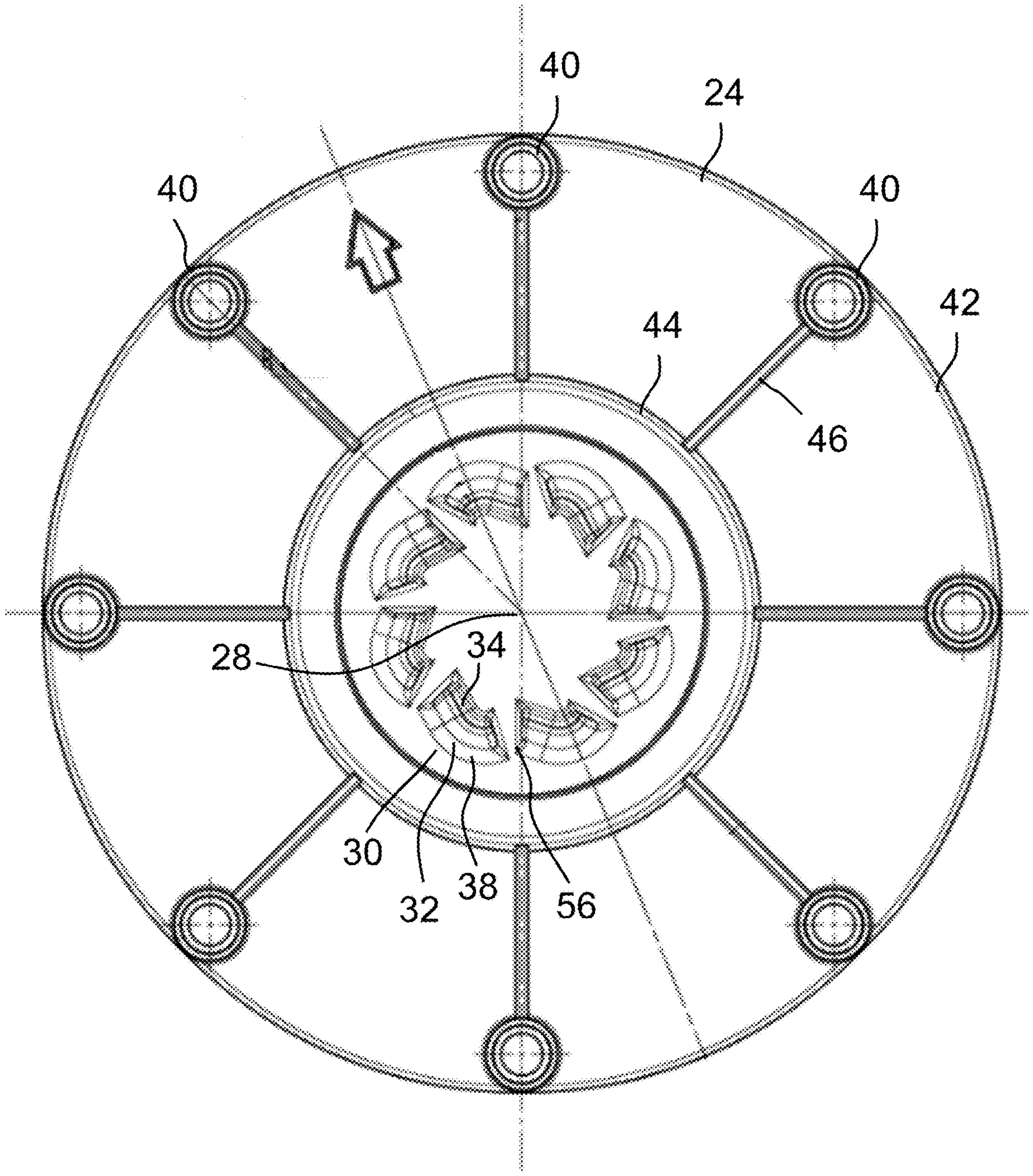
FIG. 6 shows in a top view the second end cap according to FIG. 5.

In FIG. 5 a second end cap 24 of a filter element 10 according to a further embodiment of the invention is depicted in a detailed isometric view, whereas in a top view of the second end cap 24 is shown FIG. 6.

Here, the inner adapter projections 30 are configured as curved slabs, comprising at least one arcuate section 32 and a straight section 34, wherein the straight section 34 has a longitudinal extension, and wherein a projection line in the longitudinal extension to the outer perimeter 42 intersects the outer perimeter 42. The at least one arcuate section 32 has a convexly curved side wall 38, when viewed from the outer perimeter 42. The curved slabs may be advantageous for engaging in the rosette-like receiver arrangement 116 of the housing 110. Also additional space, compared to a continuous contour, for accommodation of dust is available. Thus a favorable engagement with the receiver arrangement 116 of the housing cover 114 may be possible.

Further, as may be seen particularly in FIG. 5, the inner adapter projections 30 are provided with a conical shape tapering radially inwards in the axial direction 26 away from the first end cap 20. This may favorably facilitate mounting of the filter element 10 in the housing cover 114 because of ease of engagement of the inner adapter projections 30 in the receiver arrangement 116.

Figure 7:
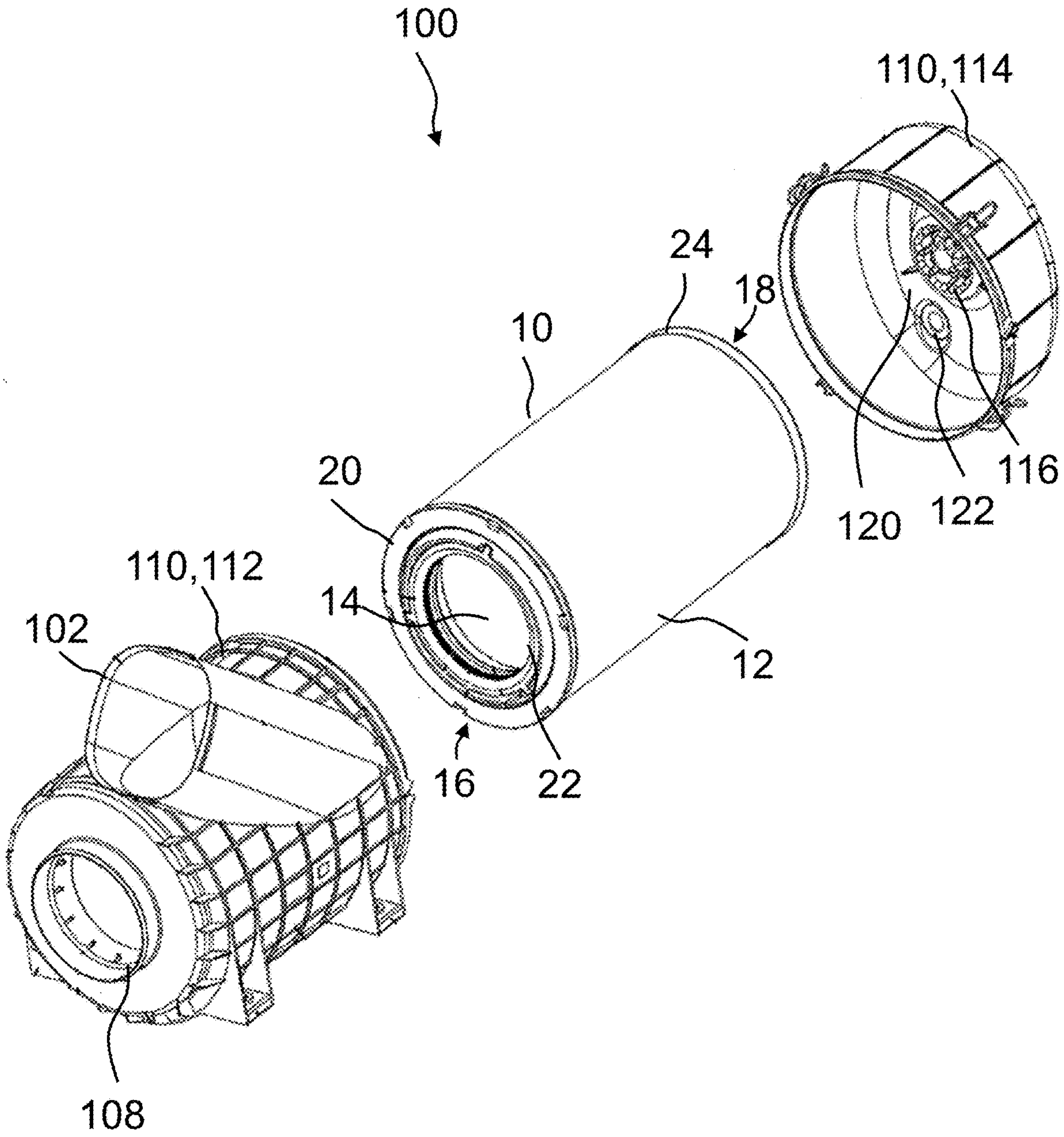
FIG. 7 shows in an exploded view a filter system with a filter element according to an embodiment of the invention.

FIG. 7 depicts in an exploded view a filter system 100 with a filter element 10 according to an embodiment of the invention.

The filter system 100 comprises a housing 110, a fluid inlet 102 formed in a first housing part 112, and a fluid outlet 108 also formed in the first housing part 112. The housing 110 is closed by a second housing part 114 as a housing cover.

The filter system 100 further comprises a serviceable filter element 10, which is operably accommodated in the housing 110.

The filter element 10 has a first end 16 and a second end 18. The second end 18 is provided with inner adapter projections 30. The inner adapter projections 30 of the second end cap 24 of the filter element 10 are projecting into a receiver arrangement 116 on the second housing part 114 in a manner providing support for the filter element 10 at the second end 18.

Figure 8:
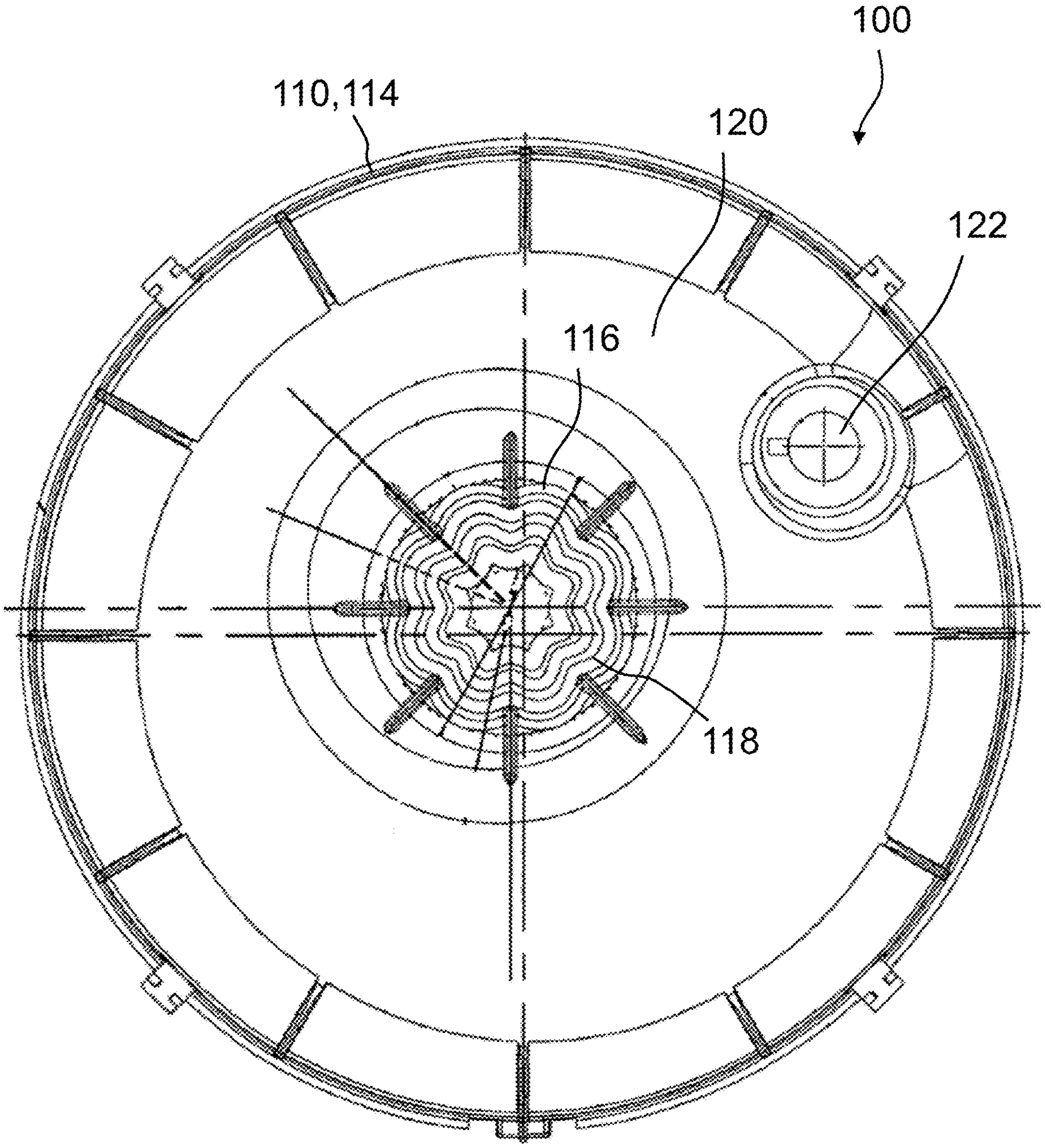
FIG. 8 shows in a top view a second housing part of the filter system according to FIG. 7 from an inside.
Figure 9:
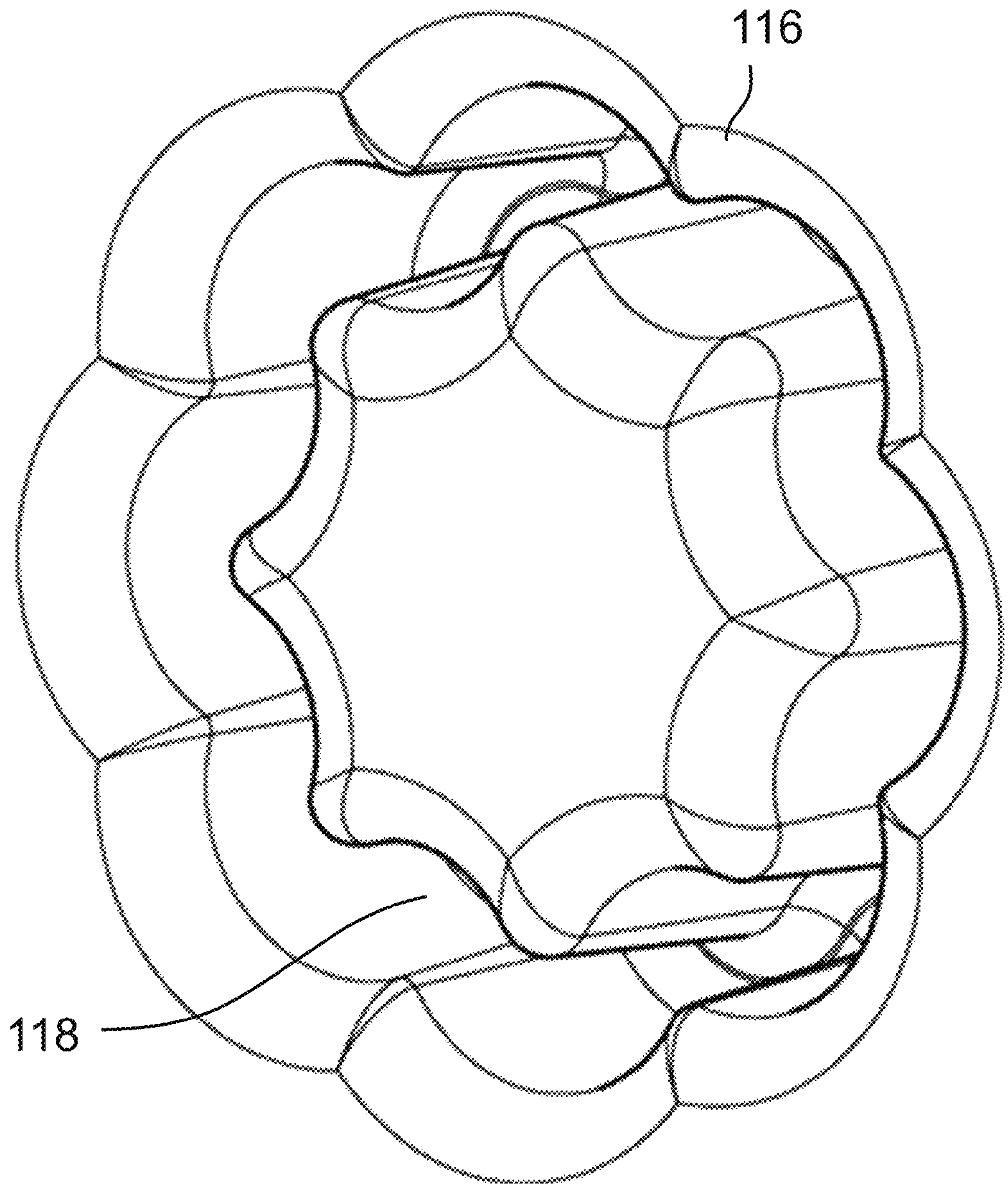
FIG. 9 shows in an isometric view a receiver arrangement of the second housing part according to FIG. 8.

FIG. 8 depicts in a top view the second housing part 114 as a housing cover of the filter system 100 from the inside, whereas the receiver arrangement 116 of the second housing part 114 is shown in FIG. 9.

The receiver arrangement 116 on the second housing part 114 is defined in a rosette-like manner as a serpentine receiving groove 118 in an inner surface 120 of the second housing part 114. The serpentine receiving groove 118 is configured as a continuous groove. Thus the filter element 10 with the inner adapter projections 30 may favorably be mounted to the second housing part 114 by engaging the discrete inner adapter projections 30 in the continuous receiving groove 118 of the receiver arrangement 116 of the second housing part 114. At least the edges of the inner adapter projections 30 abut against the wall of the receiving groove 118, thereby inhibiting a rotational movement of the filter element 10 relative to the housing 110. Hence, the sealing on the opposite end 16 of the filter element 10 is protected from friction due to rotational forces.

FIG. 8 illustrates the dust cap 122. This dust cap 122 serves for removing dust being gathered in the open space between the second end cap 24 of the filter element 10 and the second housing part 114. Thus, a better conduction of dirt towards the dust cap 122 on the housing cover 114 may be achieved, as the discrete contour of the inner adapter projections 30 improves permeability in this area.

REFERENCE NUMERALS

10 filter element
12 filter media body
14 interior
16 first end
18 second end
20 first end cap
22 air flow aperture
24 second end cap
26 central axis
28 center
30 inner adapter projection
32 arcuate section
34 straight section
38 convex curved side wall
39 open end
40 outer adapter projection
42 perimeter
44 alignment ring
46 strut
48 backside
50 support structure
52 housing seal
54 support element

56 gap
100 filter system
102 fluid inlet
108 fluid outlet
110 housing
112 housing part
114 housing part
116 receiver arrangement
118 receiving groove
120 inner surface
122 dust cap

What is claimed is:

1. A filter element comprising:

a filter media body surrounding a hollow interior and surrounding a central axis, the filter media body comprising a first end and an opposite second end spaced apart in an axial direction from the first end, wherein axial is defined herein as a direction of the central axis;

a first end cap positioned on the first end of the filter media body, wherein the first end cap comprises a central air flow aperture to the hollow interior;

a second end cap positioned on the second end of the filter media body, wherein the second end cap is a closed end cap;

wherein the second end cap comprises:

an axial alignment ring formed on an axial outer face of the second end cap and having a circumferential radially outer surface extending axially outwardly from the axial outer face; and a plurality of spaced-apart inner adapter projections arranged in a radial interior of the axial alignment ring and projecting axially outwardly from the axial outer end face of the second end cap, wherein the axial alignment ring surrounds the plurality of spaced-apart inner adapter projections and is radially spaced apart from the plurality of spaced-apart inner adapter projections, wherein at least some of the spaced-apart inner adapter projections are positioned in a circular arrangement surrounding a center of the second end cap, wherein at least some of the inner adapter projections are configured as straight slabs having a longitudinal extension, the straight slabs having straight axially extending outer surfaces maintaining a constant cross section shape of the straight slabs in the longitudinal extension, wherein at least some of the inner adapter projections are hollow and comprise an open end that opens in the axial direction away from the first end cap.

2. The filter element according to claim 1, wherein at least some of the inner adapter projections are configured as curved slabs, each comprising at least one arcuate section and a straight section, wherein the straight section comprises a longitudinal extension.

3. The filter element according to claim 2, wherein the at least one arcuate section has a convexly curved side wall when viewed from the outer perimeter.

4. The filter element according to claim 1, wherein at least some of the inner adapter projections have a conical shape tapering radially inwardly in the axial direction away from the first end cap.

5. The filter element according to claim 1, wherein the inner adapter projections are distributed equidistantly around the central axis.

6. The filter element according to claim 1, wherein the inner adapter projections are distributed non-equidistantly around the central axis.

7. The filter element according to claim 1, wherein the second end cap comprises a plurality of spaced-apart outer adapter projections positioned adjacent to an outer perimeter of the second end cap, wherein the outer adapter projections each project in a direction of the central axis away from the first end cap.

8. The filter element according to claim 1, wherein the second end cap further comprises radial struts formed on and projecting axially outwardly on the axial outer face of the second end cap, each radial struct extending radially from the circumferential radially outer surface of the alignment ring to a respective one of the outer adapter projections, thereby connecting the alignment ring through the radial struts to the outer adapter projections to enhance the stiffness of the second end cap.

9. The filter element according to claim 1, wherein a backside of the second end cap comprises a support structure.

10. The filter element according to claim 9, wherein the support structure is a grid.

11. A filter system comprising:

a housing comprising a first housing part and a second housing part, wherein the first housing part comprises a fluid inlet and further comprises a fluid outlet, wherein the second housing part comprises a receiver arrangement and is configured to close the housing;

a filter element according to claim 1, wherein the filter element is operatively accommodated in the housing;

wherein the inner adapter projections of the second end cap of the filter element project into the receiver arrangement of the second housing part, wherein the receiver arrangement supports the filter element at the second end cap.

12. The filter system according to claim 11, wherein the receiver arrangement of the second housing part is a serpentine receiving groove in an inner surface of the second housing part.

13. The filter system according to claim 11, wherein the serpentine receiving groove is a continuous groove.

14. The filter system according to claim 11, wherein the serpentine receiving groove is comprised of spaced-apart groove sections.

* * * * *